United States Patent
Li (10) Patent No.: US 10,833,988 B2
(45) Date of Patent: Nov. 10, 2020

(54) GENERATING TABLE ENTRY AND FORWARDING PACKET IN SOFTWARE DEFINED NETWORK

(71) Applicant: NEW H3C TECHNOLOGIES CO., LTD., Hangzhou (CN)

(72) Inventor: Jinglin Li, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 68 days.

(21) Appl. No.: 15/777,628

(22) PCT Filed: Nov. 24, 2016

(86) PCT No.: PCT/CN2016/107037
§ 371 (c)(1),
(2) Date: May 18, 2018

(87) PCT Pub. No.: WO2017/088780
PCT Pub. Date: Jun. 1, 2017

(65) Prior Publication Data
US 2018/0375767 A1    Dec. 27, 2018

(30) Foreign Application Priority Data
Nov. 27, 2015   (CN) .......................... 2015 1 0854463

(51) Int. Cl.
*H04L 12/741*   (2013.01)
*H04L 12/721*   (2013.01)
(Continued)

(52) U.S. Cl.
CPC .......... *H04L 45/745* (2013.01); *H04L 45/125* (2013.01); *H04L 45/38* (2013.01); *H04L 45/42* (2013.01); *H04L 45/54* (2013.01)

(58) Field of Classification Search
CPC ....... H04L 45/745; H04L 45/54; H04L 45/42; H04L 45/125; H04L 45/38; H04L 45/00
See application file for complete search history.

(56) References Cited

U.S. PATENT DOCUMENTS 6,055,561 A  *  4/2000  Feldman ............. H04L 12/4608
                                                        709/200
6,977,932 B1 *  12/2005  Hauck ................. H04L 12/4633
                                                        370/392
(Continued)

FOREIGN PATENT DOCUMENTS

CN    102271079 A    12/2011
CN    103414650 A    11/2013
(Continued)

OTHER PUBLICATIONS

European Patent Office, Extended European Search Report Issued in Application No. 16868003.1, dated Oct. 9, 2018, Germany, 7 pages.
(Continued)

Primary Examiner — Hoang-Chuong Q Vu
(74) Attorney, Agent, or Firm — McCoy Russell LLP (57) ABSTRACT

A SDN controller calculates forwarding paths for a traffic flow based on SDN technology. The controller determines a maximum flow rate and flow rate identify of each forwarding path, generates ingress flow table entries based on packet characteristic information of the traffic flow, the flow rate identify and an output port of an ingress node on each forwarding path, and sends the ingress flow table entries and maximum flow rate and flow rate identify to the ingress node; generates intermediate flow table entry for each intermediate node base on the packet characteristic information, flow rate identify and an and the output port of each intermediate node, and send each intermediate flow table entry to corresponding intermediate node; generates an egress flow table entry based on packet characteristic infor- (Continued)

mation and an output port of an egress node for sending the traffic flow, and sends the egress flow table entry to the egress node.

11 Claims, 6 Drawing Sheets

(51) Int. Cl.
*H04L 12/717* (2013.01)
*H04L 12/729* (2013.01)

(56) References Cited

U.S. PATENT DOCUMENTS

| | | | |
|---|---|---|---|
| 8,942,256 B1* | 1/2015 | Barth | H04L 43/0847 370/469 |
| 2001/0007557 A1* | 7/2001 | Yamada | H04L 45/00 370/389 |
| 2007/0153683 A1* | 7/2007 | McAlpine | H04L 43/00 370/229 |
| 2011/0106518 A1* | 5/2011 | Shin | H04L 41/145 703/21 |
| 2011/0199941 A1* | 8/2011 | Ouellette | H04L 12/1836 370/256 |
| 2011/0225312 A1* | 9/2011 | Liu | H04N 21/632 709/231 |
| 2014/0119367 A1* | 5/2014 | Han | H04L 12/4633 370/389 |
| 2014/0140216 A1 | 5/2014 | Liu et al. | |
| 2014/0241356 A1 | 8/2014 | Zhang et al. | |
| 2014/0269288 A1 | 9/2014 | Crisan et al. | |
| 2014/0269721 A1* | 9/2014 | Bashandy | H04L 45/12 370/392 |
| 2014/0376383 A1 | 12/2014 | McCormick et al. | |
| 2015/0236968 A1* | 8/2015 | Zhang | H04L 47/32 370/230 |
| 2017/0019337 A1 | 1/2017 | Fujinami | |
| 2017/0041234 A1 | 2/2017 | Lin et al. | |
| 2017/0126475 A1* | 5/2017 | Mahkonen | H04L 43/04 |
| 2018/0083871 A1* | 3/2018 | Filsfils | H04L 45/58 |
| 2018/0287932 A1* | 10/2018 | Viquez Calderon | H04L 45/38 |

FOREIGN PATENT DOCUMENTS

| | | |
|---|---|---|
| CN | 104378298 A | 2/2015 |
| CN | 104580000 A | 4/2015 |
| JP | 2015103854 A | 6/2015 |
| WO | 2013105551 A1 | 7/2013 |
| WO | 2015151442 A1 | 10/2015 |
| WO | 2015161409 A1 | 10/2015 |

OTHER PUBLICATIONS

European Patent Office, Office Action Issued in Application No. 16868003.1, dated Oct. 31, 2019, Netherlands, 5 pages.
ISA State Intellectual Property Office of the People's Republic of China, Written Opinion of the International Searching Authority Issued in Application No. PCT/CN2016/107037, dated Feb. 16, 2017, WIPO, 4 pages.
State Intellectual Property Office of the People's Republic of China, Office Action and Search Report Issued in Application No. 201510854463.9, dated Apr. 25, 2019, 13 pages. (Submitted with Partial Translation).
Japanese Patent Office, Office Action Issued in Application No. 2018-527106, dated May 14, 2019, 7 pages. (Submitted with Machine Translation).
ISA State Intellectual Property Office of the People's Republic of China, International Search Report Issued in Application No. PCT/CN2016/107037, dated Feb. 16, 2017, 4 pages.
European Patent Office, Office Action Issued in Application No. 16868003.1, dated Aug. 11, 2020, Netherlands, 5 pages.

\* cited by examiner

GENERATING TABLE ENTRY AND FORWARDING PACKET IN SOFTWARE DEFINED NETWORK

CROSS-REFERENCE TO RELATED APPLICATIONS

The present application is a U.S. National Phase of International Patent Application Serial No. PCT/CN2016/107037 entitled "SOFTWARE-DEFINED-NETWORKING TABLE-ENTRY GENERATION AND PACKET FORWARDING," filed on Nov. 24, 2016. International Patent Application Serial No. PCT/CN2016/107037 claims priority to Chinese Patent Application No. 201510854463.9, filed on Nov. 27, 2015. The entire contents of each of the above-cited applications are hereby incorporated by reference in their entirety for all purposes.

BACKGROUND

The process of a packet passing through a network from a source site to a destination site is a process of the packet being routed and forwarded. Forwarding nodes traversed by the packet between the source site and the destination site may include routers and switches. In a network topology where not all nodes are directly connected with each other, multiple forwarding paths may exist between a source site and a destination site in theory, and one of the forwarding paths may be selected for transporting a packet.

In an IP network which performs layer-3 forwarding, for example, different forwarding paths may exist between two routers. Routing and forwarding between the two routers may be performed based on an optimal route generated based on the shortest path with the lowest cost or based on ECMP (Equal Cost Multi Path) paths generated based on a plurality of paths with the same cost according to a dynamic routing protocol based on link parameters of the routers (e.g., link type, bandwidth, or the like).

DETAILED DESCRIPTIONS

For simplicity and illustrative purposes, the present disclosure is described by referring mainly to examples thereof. Apparently, not all of embodiments are described herein. Details mentioned in the embodiments are merely for facilitating understanding of the technical mechanism, and implementation of the technical mechanism is not necessarily limited to those details. In order to avoid unnecessarily obscure the technical mechanism of the present disclosure, some examples are not described in detail, and only frameworks are provided. As used herein, the term "includes" means includes but not limited to, the term "including" means including but not limited to. The term "based on" means based at least in part on but not limited to. The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in similar manner.

Figure 1:
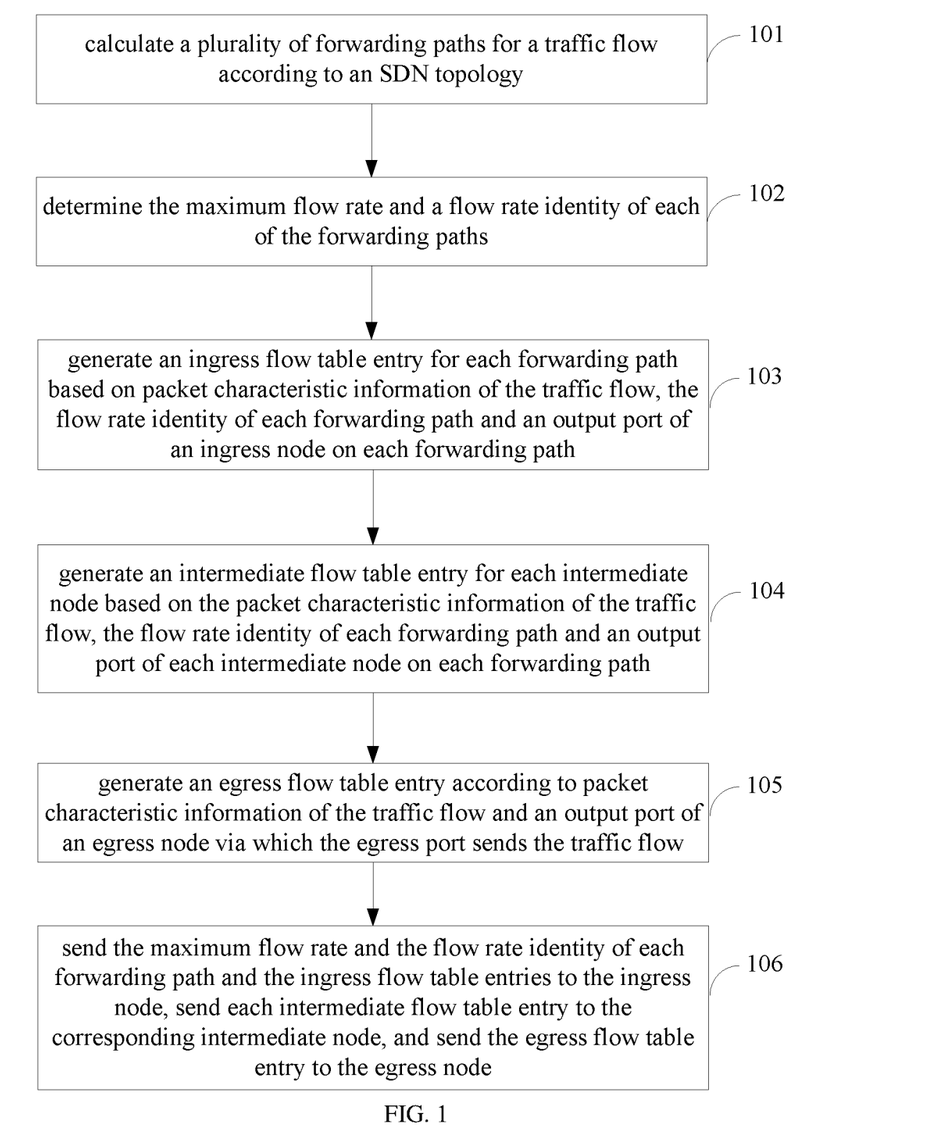
FIG. 1 is a flowchart illustrating a method of generating forwarding table entries by an SDN controller in accordance with examples of the present disclosure.

FIG. 1 is a flowchart illustrating a process of generating forwarding table entries by an SDN controller in accordance with examples of the present disclosure.

At block 101, a plurality of forwarding paths may be calculated for a traffic flow based on an SDN topology.

At block 102, the maximum flow rate and a flow rate identity may be determined for each of the forwarding paths.

At block 103, an ingress flow table entry may be generated for each of the forwarding paths according to packet characteristic information of the traffic flow, the flow rate identity of each of the forwarding paths and output ports of an ingress node on the forwarding paths.

At block 104, an intermediate flow table entry may be generated for each intermediate node based on the packet characteristic information of the traffic flow, the flow rate identity of each of the forwarding paths and output port of each intermediate on the corresponding forwarding paths.

At block 105, an egress flow table entry may be generated based on the packet characteristic information of the traffic flow and an output port of an egress node via which the egress node sends the traffic flow.

At block 106, the maximum flow rate and the flow rate identity of each of the forwarding paths and the ingress flow table entries may be sent to the ingress node, each of intermediate flow table entries may be sent to the corresponding intermediate node, and the egress flow table entry may be sent to the egress node.

The packet characteristic information of the traffic flow refers to an identity used in forwarding packets of the traffic flow within an SDN forwarding domain. The ingress device can be the first SDN switching device ingressing a packet of the traffic flow into the SDN domain, may identify packet characteristic information of the packet based on information in the packet, and add the packet characteristic information to the packet so that downstream SDN switching devices along the forwarding path may forward the packet based on the added packet characteristic information and the flow rate of the traffic flow without parsing the packet.

The flow rate identity may be an identity pre-defined to associate with a flow rate, e.g., it may be defined that "00" denotes 5M, "01" denotes 10M, "10" denotes 15M, or the like.

Based on the method as shown in FIG. 1, the SDN controller may generate flow table entries for an ingress node and intermediate nodes based on each forwarding path of the traffic flow in the SDN and flow rate of each forwarding path, so that the ingress node and the intermediate nodes on the forwarding paths of the traffic flow can select paths for forwarding packets based on the flow table entries.

Figure 2:
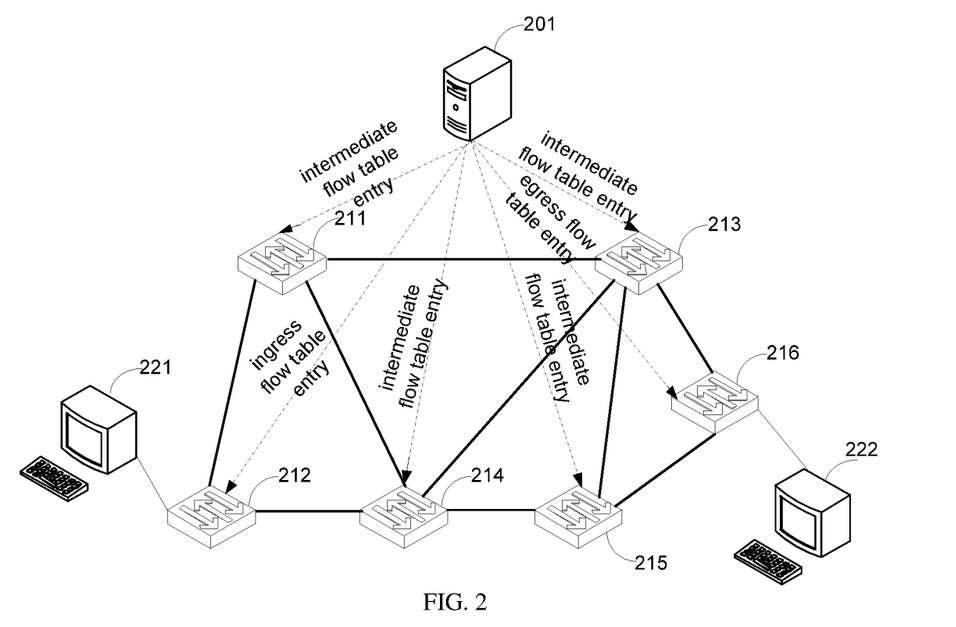
FIG. 2 is a schematic diagram illustrating a software defined network (SDN) in accordance with examples of the present disclosure.

As shown in FIG. 2, the SDN comprises an SDN controller 201 and SDN switching devices 211-216 operating under an open flow protocol. The SDN switching device 212 and the SDN switching device 216 are respectively connected to host 221 and host 222.

After receiving a packet sent by the host 221 to the host 222, the SDN switching device 211 may send the packet to the SDN controller 201 based on a default flow table entry when failing to find a flow table entry matching with the packet. The SDN controller 201 may calculate three forwarding paths based on the SDN network topology and link states:

a first forwarding path: SDN switching device 212→SDN switching device 211→SDN switching device 213→SDN switching device 216;

a second forwarding path: SDN switching device 212→SDN switching device 211→SDN switching device 214→SDN switching device 215→SDN switching device 213→SDN switching device 216;

a third forwarding path: SDN switching device 212→SDN switching device 214→SDN switching device 215→SDN switching device 216.

Another SDN switching device receiving the first packet of another traffic flow may send the first packet to the SDN controller when a flow table entry corresponding to the first packet is not found in a local flow table. The SDN controller may calculate a plurality of available forwarding paths for the first packet of the traffic flow based on traffic characteristic information of the first packet, SDN network topology and link states.

Besides calculating forwarding paths in response to reception of the first packets of traffic flows from the SDN switching devices 211-216, the SDN controller 201 may also calculate a plurality of forwarding paths for each traffic flow in a pre-defined flow characteristic table based on the flow characteristic table, the SDN network topology and link states.

In a typical layer-3 forwarding network, packets are forwarded based on the shortest path and ECMP obtained from route calculations. The route calculations may not be re-converged unless forwarding paths obtained from previous route calculations are failed. As such, other forwarding paths cannot be selected even if the shortest path or the ECMPs are congested. The SDN as shown in FIG. 2, however, can select a forwarding path dynamically based on the flow rate of the traffic flow, and may forward packets through forwarding paths which may include a shortest path, or ECMP, or a forwarding path whose cost is larger than the shortest path or the ECMP, thus can avoid path congestion.

Besides conforming to SDN protocols such as the open flow protocol or the like, the switching devices in the SDN as shown in FIG. 2 may also operate under a layer-3 forwarding protocol such as IP protocol, the MPLS protocol, etc., or a layer-2 forwarding protocol including the Ethernet protocol or the VPLS protocol, etc.

The SDN controller 201 may calculate the maximum flow rate of each of the three forwarding paths based on the maximum bandwidth of each link in each of the three forwarding paths. For example, assuming the maximum flow rates of the three forwarding paths calculated by the SDN controller 201 may be 5M, 10M and 15M respectively.

The SDN controller 201 may allocate flow rate identities "00", "01" and "10" respectively to the maximum flow rates of the three forwarding paths. The SDN controller 201 may allocate the flow rate identities to the forwarding paths in a descending order or an ascending order of the maximum flow rates of the forwarding paths, or may allocate a flow rate identity corresponding to the maximum flow rate of a forwarding path to the forwarding path. The allocation manner is not limited here. Likewise, the format of the flow rate identity is also not limited.

The SDN controller 201 may determine the output port of the SDN switching device 212 on the first forwarding path based on the port of the SDN switching device 212 which connects with the SDN switching device 211 on the first forwarding path, and generate the first ingress flow table entry based on packet characteristic information of the traffic flow, the flow rate identity 00 of the first forwarding path and the output port of the SDN switching device 212 on the first forwarding path. In the first ingress flow table entry, a match field may include the packet characteristic information of the traffic flow and the flow rate identity 00, an instruction field may include the output port of the SDN switching device 212 on the first forwarding path, an action of adding the flow rate identity 00 and an action of forwarding a packet carrying the flow rate identity 00 through the output port of the SDN switching device 212 on the first forwarding path.

The SDN controller 201 may determine the output port of the SDN switching device 211 on the first forwarding path based on the port of the SDN switching device 211 which connects with the SDN switching device 213 on the first forwarding path, and generate a first intermediate flow table entry of the SDN switching device 211 based on packet characteristic information of the traffic flow, the flow rate identity 00 on the first forwarding path and the output port of the SDN switching device 211 on the first forwarding path. In the first intermediate flow table entry, a match field may include the packet characteristic information of the traffic flow and the flow rate identity 00, an instruction field may include the output port of the SDN switching device 211 on the first forwarding path, an action of adding the flow rate identity 00 and an action of forwarding a packet carrying the flow rate identity 00 through the output port of the SDN switching device 211 on the first forwarding path.

The SDN controller 201 may determine the output port of the SDN switching device 213 on the first forwarding path based on the port of the SDN switching device 213 which connects with the SDN switching device 216 on the first forwarding path, and generate an intermediate flow table entry of the SDN switching device 213 based on the packet characteristic information of the traffic flow, the flow rate identity 00 on the first forwarding path and the output port of the SDN switching device 213 on the first forwarding path. In the intermediate flow table entry, a match field may include the packet characteristic information of the traffic flow and the flow rate identity 00, an instruction field may include the output port of the SDN switching device 213 on the first forwarding path, an action of adding the flow rate identity 00 and an action of forwarding a packet carrying the flow rate identity 00 through the output port of the SDN switching device 213 on the first forwarding path.

The SDN controller 201 may determine the output port of the SDN switching device 212 on the second forwarding path based on the port of the SDN switching device 212 which connects with the SDN switching device 211 on the second forwarding path, and generate an ingress flow table entry based on the packet characteristic information of the traffic flow, the flow rate identity 01 on the second forwarding path and the output port of the SDN switching device 212 on the second forwarding path. In the ingress flow table entry, a match field may include the packet characteristic information of the traffic flow and the flow rate identity 01, an instruction field may include the output port of the SDN switching device 212 on the second forwarding path, an action of adding the flow rate identity 01 and an action of forwarding a packet carrying the flow rate identity 01 through the output port of the SDN switching device 212 on the second forwarding path.

The SDN controller 201 may generate intermediate flow table entries for intermediate SDN switching devices on the second forwarding path and the third forwarding path in the same manner with that of generating the intermediate flow table entries for the SDN switching devices 211 and 213 on the first forwarding path.

The SDN controller 201 may determine a port through which packets are sent to the host 222 on the SDN switching device 216 to be the output port of the SDN switching device 216, and generate an egress flow table entry based on the packet characteristic information of the traffic flow and the output port of the SDN switching device 216. In the egress flow table entry, a match field may include the packet characteristic information of the traffic flow, and the instruction field may include the output port of the SDN switching device 216, an action of removing the flow rate identity and an action of sending a packet being removed with the flow rate identity via the output port.

The three forwarding paths have different maximum flow rates, and the SDN controller 201 may generate ingress flow table entries for the ingress node by taking the flow rate identity of each of the forwarding paths as one of matching rules, and generate intermediate flow table entries for intermediate nodes on each of the forwarding paths, to enable the ingress node and the intermediate nodes to select a forwarding path based on the changing flow rate of the traffic flow. The egress node does not have to select a forwarding path to send the packet to the destination host based on the flow rate. Thus the SDN controller 201 may generate an egress flow table entry for the egress node which takes the packet characteristic information as a matching rule, so that packets of the traffic flow that are forwarded along the three forwarding paths can match with the egress flow table entry. Hence, the resources of forwarding chips in the SDN switching devices for storing table entries can be saved.

The SDN controller 201 may send the maximum flow rate and flow rate identity of each forwarding path in a custom field of a packet conforming to an open flow protocol to the ingress node of the traffic flow, i.e., the SDN switching device 212.

Figure 3:
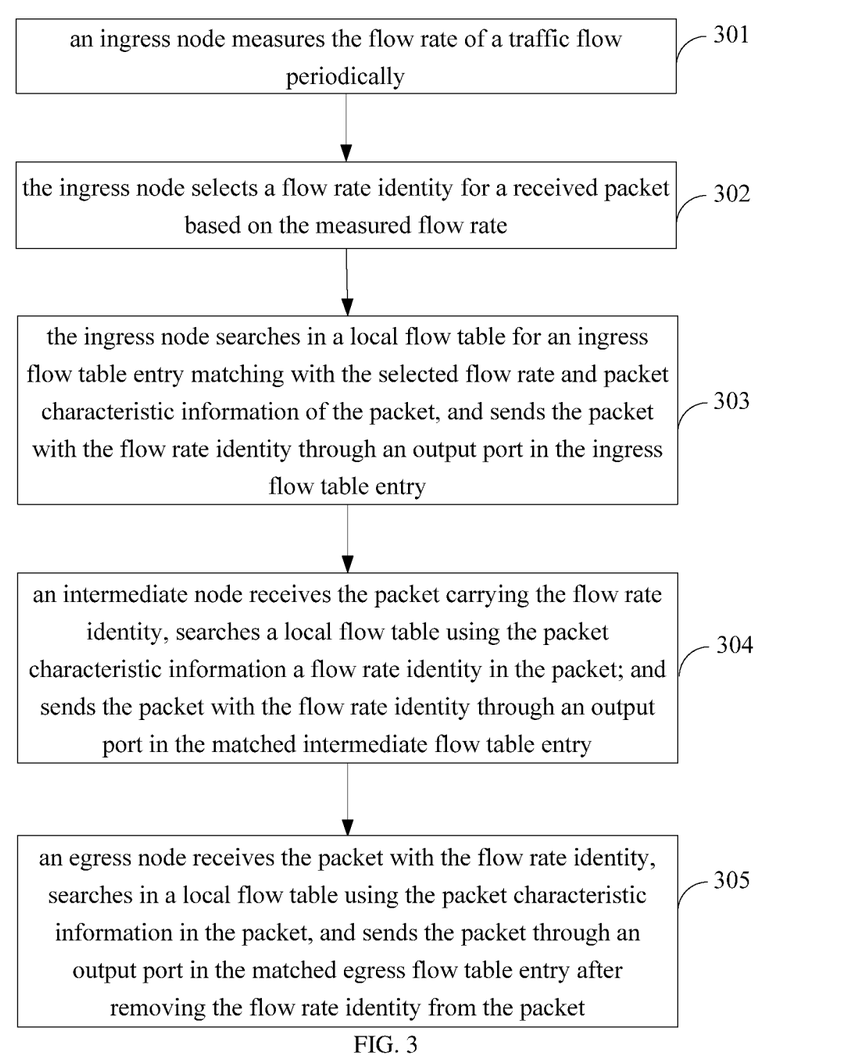
FIG. 3 is a flowchart illustrating a process of selecting different forwarding paths for traffic flows by an SDN switching device according to flow table entries in an SDN.

The SDN controller 201 may send the ingress flow table entry generated based on the first forwarding path to the SDN switching device 212, and send the intermediate flow table entries generated based on the first forwarding path to the SDN switching devices 211 and 213 respectively; send the ingress flow table entry generated based on the second forwarding path to the SDN switching device 212, and send the intermediate flow table entries generated based on the second forwarding path to the SDN switching devices 211, 214, 215 and 213 respectively; send the ingress flow table entry generated based on the third forwarding path to the SDN switching device 212, and send the intermediate flow table entries generated based on the third forwarding path to the SDN switching devices 214 and 215 respectively; and send the egress flow table entry to the SDN switching device 216. FIG. 3 is a flowchart illustrating a process of selecting different forwarding paths for traffic flows by an SDN switching device in the SDN as shown in FIG. 2 based on flow table entries.

During the processing procedure 301, the SDN switching device 212 may serve as an ingress device of a traffic flow sent by the host 221 to the host 222, and measure the flow rate of the traffic flow periodically.

During the processing procedure 302, after detecting the measured flow rate of the traffic flow is 6M, the SDN switching device 212 may compare the flow rate 6M of the traffic flow respectively with the maximum flow rate of each of the three forwarding paths and select the flow rate identity 01 of the second forwarding path whose maximum flow rate is 10M.

During the processing procedure 303, the SDN switching device 212 may search in a local flow table based on the packet characteristic information of the traffic flow and the flow rate identity 01 and may find out the ingress flow table entry generated based on the second forwarding path. The SDN switching device 212 may add the flow rate identity 01 to the packet and send the packet carrying the flow rate identity 01 through a port on the second forwarding path based on actions in the instruction field of the matched ingress flow table entry. As such, the SDN switching device 212 may send the packet carrying the flow rate identity 01 to the SDN switching device 211 on the second forwarding path.

Through the processing procedures 302 and 303, the SDN switching device 212 performs the selection of forwarding path and provides flow rate information for intermediate nodes on the forwarding path to perform path selection by adding the flow rate identity into the packet.

During the processing procedure 304, the SDN switching device 211 may receive the packet carrying the flow rate identity 01, search in a local flow table, and may find out the intermediate flow table entry generated based on the second forwarding path. The SDN switching device 211 may send the packet carrying the flow rate identity 01 via a port on the second forwarding path based on actions in the matched intermediate flow table entry. As such, the SDN switching device 211 may send the packet carrying the flow rate identity 01 to the SDN switching device 214 on the second forwarding path. After that, the SDN switching devices 215 and 213 on the second forwarding may act similarly to find out intermediate flow table entries matching with the packet in respective local flow tables, and send the packet carrying the flow rate identity 01 based on actions in the instruction field of respective matched intermediate flow table entries. In this way, packets of the traffic flow may be sent by the ingress node, i.e., the SDN switching device 212, to the egress node which is the SDN switching device 216 through intermediate nodes including the SDN switching devices 211, 214, 213 and 215 along the second forwarding path.

Through the processing procedure 304, SDN switching devices which serve as intermediate nodes may forward the packets by based on intermediate flow table entries that match with the flow rate identity and the packet characteristic information in the packet, thus realize flow rate-based path selection.

During the processing procedure 305, the SDN switching device 216 may receive a packet which carries the flow rate identity 01, finding out an egress flow table entry of the traffic flow based on the packet characteristic information of the packet, and send the packet to the host 222 based on actions in the matched egress flow table entry after removing the flow rate identity 01 from the packet.

When the ingress node of the traffic flow detects a change in the flow rate of the traffic flow, the ingress node, the intermediate nodes and the egress node may repeat the above processing procedures 301-305.

When detecting the measured flow rate of the traffic flow is 3M, the SDN switching device 212 may compare the flow rate 3M of the traffic flow respectively with the maximum flow rate of each of the three forwarding paths and select the flow rate identity 00 of the first forwarding path whose maximum flow rate is 5M. The SDN switching device 212 may search in a local flow table based on the packet characteristic information of the traffic flow and the flow rate identity 00 and may find out the ingress flow table entry generated based on the first forwarding path. The SDN switching device 212 may add the flow rate identity 00 to the packet and send the packet in which the flow rate identity 00 has been added through a port on the first forwarding path based on actions in the instruction field of the matched ingress flow table entry. As such, the SDN switching device 212 may send the packet which includes the flow rate identity 00 to the SDN switching device 211 which is an intermediate node on the first forwarding path. Likewise, the SDN switching devices 211 and 213 which serve as intermediate nodes on the first forwarding path may find out respective intermediate flow table entries matching with the flow rate identity 00 and the packet characteristic information, and forward the packet of the traffic flow along the first forwarding path to the egress node, i.e., the SDN switching device 216. The SDN switching device 216 may send the packet to the host 222 based on the corresponding egress flow table entry after removing the flow rate identity 00 from the packet.

When the flow rate of the traffic flow increases, e.g., when the SDN switching device 212 detects the measured flow rate of the traffic flow is 12M, the SDN switching device may select the flow rate identity 10 of the third forwarding path whose maximum flow rate is 15M. The SDN switching device 212 may search in a local flow table based on the packet characteristic information of the traffic flow and the flow rate identity 10 and may find out the ingress flow table entry generated based on the third forwarding path. The SDN switching device 212 may add the flow rate identity 10 to the packet and send the packet in which the flow rate identity 10 has been added through a port corresponding to the third forwarding path based on actions in the instruction field of the matched ingress flow table entry. As such, the SDN switching device 212 may send the packet which includes the flow rate identity 10 to the SDN switching device 214 on the third forwarding path. Other intermediate nodes 215 and 213 on the third forwarding path may likewise forward the packet based on respective intermediate flow table entries, and the process is not repeated herein. When the packet which carries the flow rate identity 10 is forwarded to the SDN switching device 216, the SDN switching device 216 may send the packet to the host 222 based on the egress flow table entry matching with the packet after removing the flow rate identity 10 from the packet.

The SDN switching device 212 may select the third forwarding path whose maximum flow rate is 15M for forwarding packets of the traffic flow before the first measurement period is completed so as to avoid packet loss of the traffic flow.

The SDN switching device 212 may select the third forwarding path, i.e., the forwarding path with the maximum flow rate, when the flow rate of the traffic flow measured in an arbitrary measurement period exceeds the maximum flow rate of the three forwarding paths.

The SDN switching device 216 may determine the egress flow table entry not matching with a packet sent by the host 222 to the host 221 because the packet does not carry a flow rate identity. The SDN switching device 216 may send the packet as the first packet of a traffic flow to the SDN controller 201. The SDN controller 201 may calculate a plurality of forwarding paths, generate ingress flow table entries, intermediate flow table entries and an egress flow table entry, and send the ingress flow table entries, intermediate flow table entries and the egress flow table entry to the ingress node which is the SDN switching device 216, intermediate nodes and egress node 211 (not shown in the drawings).

For packet sent from the host 221 to the host 222 and packet sent from the host 222 to the host 221, they may have reversed source address information and destination address information, such as MAC (media access control) address, IP (Internet Protocol) address, MPLS (Multi-protocol Label Switching) label. Source address information and destination address information in match fields of the intermediate flow table entries for intermediate nodes on forwarding paths of the packet sent from the host 221 to the host 222 may be the reverse of the source address information and destination address information in the intermediate flow table entries for intermediate nodes on forwarding paths of packets sent from the host 222 to the host 221. When the SDN switching devices 211 and 216 serve as intermediate nodes on other forwarding paths, the SDN switching devices 211 and 216 may receive intermediate flow table entries generated by the SDN controller 201. As such, the SDN switching devices 211-216 may store ingress flow table entries, intermediate flow table entries and egress flow table entries for dynamically selecting forwarding paths for traffic flows based on changing flow rates of the traffic flows.

Figure 4:
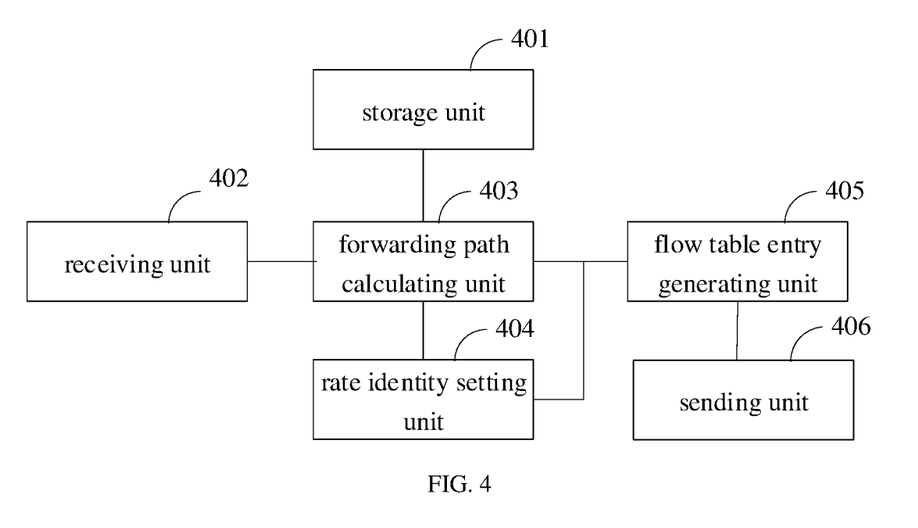
FIG. 4 is a schematic diagram illustrating an SDN controller in accordance with examples of the present disclosure.

As shown in FIG. 4, the SDN controller based on examples of the present disclosure may include: a storage unit 401, a receiving unit 402, a forwarding path calculating unit 403, a rate identity setting unit 404, a flow table entry generating unit 405 and a sending unit 406.

The forwarding path calculating unit 403 may calculate a plurality of forwarding paths for a traffic flow in a predefined flow characteristic list based on the flow characteristic list stored in the storage unit 401 and an SDN topology and link states collected. In another example, the receiving unit 402 may receive the first packet of a traffic flow, and the forwarding path calculating unit 403 may determine an egress node of the traffic flow in the SDN topology based on the first packet of the traffic flow received by the receiving unit 402 from an ingress node, the SDN topology and link states collected, and calculate a plurality of forwarding paths between the ingress node and the egress node for the traffic flow. In this manner, the forwarding path calculating unit 403 may calculate a plurality of forwarding paths for a traffic flow based on the SDN topology.

The rate identity setting unit 404 may determine the maximum flow rate and a flow rate identity of each forwarding path. For example, the rate identity setting unit 404 may determine the maximum flow rate of each forwarding path based on the bandwidth of each link on each forwarding path, and set a flow rate identity for each forwarding path in an order determined based on the maximum flow rate of the forwarding paths.

The flow table entry generating unit 405 may generate ingress flow table entries based on packet characteristic information of the traffic flow and the flow rate identity of each forwarding path of the traffic flow and output ports of the ingress node on each forwarding path, generate each intermediate flow table entry for each intermediate node based on the packet characteristic information of the traffic flow, the flow rate identity of each forwarding path and output port of each intermediate node on each forwarding path, and generate one egress flow table entry for the egress node of the traffic flow.

The sending unit 406 may send the maximum flow rate and the flow rate identity of each of the forwarding paths and the generated ingress flow table entries to the ingress node, each intermediate flow table entry to each corresponding intermediate node, and the egress flow table entry to the egress node.

In each of the ingress flow table entries of the traffic flow generated by the flow table entry generating unit 405, a matching rule may include at least packet characteristic information and a flow rate identity, an instruction field may include at least an output port of the ingress node on a forwarding path, an action of adding a flow rate identity and an action of sending the packet carrying the flow rate identity through the output port of the ingress node on the forwarding path.

In each of the intermediate flow table entries of the traffic flow generated by the flow table entry generating unit 405, a matching rule may include at least packet characteristic information and a flow rate identity, an instruction field may include at least an output port of the intermediate node on a forwarding path, an action of sending a packet with a flow rate identity through the output port of the intermediate node on a forwarding path.

In the egress flow table entry of the traffic flow generated by the flow table entry generating unit 405, a matching rule may include at least packet characteristic information and a flow rate identity, an instruction field may include at least an output port of the egress node, an action of removing a flow rate identity and an action of sending the packet without a flow rate identity through the output port of the egress node.

Figure 5:
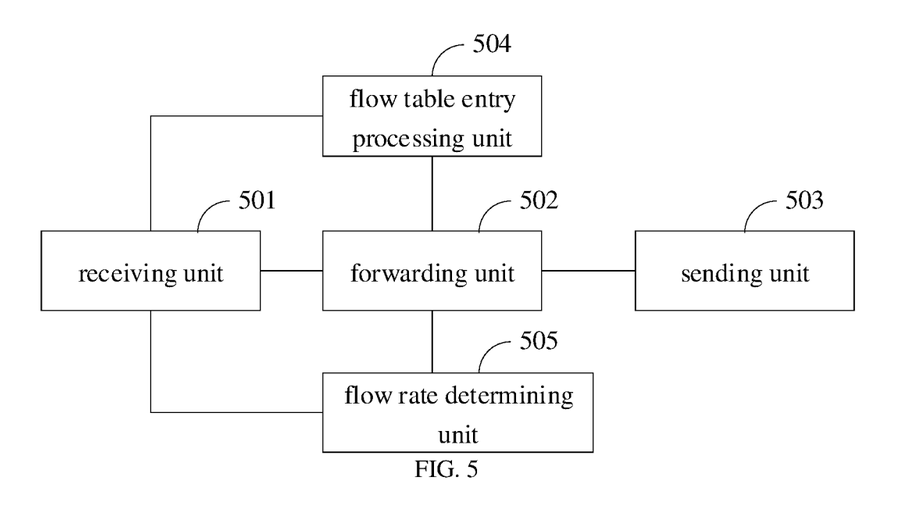
FIG. 5 is a schematic diagram illustrating an SDN switching device in accordance with examples of the present disclosure.

As shown in FIG. 5, the SDN switching device based on examples of the present disclosure may include: a receiving unit 501, a forwarding unit 502, a sending unit 503, a flow table entry processing unit 504 and a flow rate determining unit 505.

The forwarding unit 502 may send the first packet of a traffic flow received by the receiving unit 501 to the SDN controller via the sending unit 503 based on a default flow table entry in a local flow table when no matching flow table entry is found, to request the SDN controller to calculate a plurality of forwarding paths for the traffic flow of the first packet and generate corresponding ingress flow table entries, one egress flow table entry and intermediate flow table entries. Based on various examples, the receiving unit 501 may receive the maximum flow rate and flow rate identity of each forwarding path sent by the SDN controller in a custom field of a packet conforming to an open flow protocol. The receiving unit 501 may receive a plurality of ingress flow table entries sent by the SDN controller via a packet conforming to the open flow protocol. The ingress flow table entries have the same first packet characteristic information and different flow rate identity in respective match fields. The first packet characteristic information is related with the traffic flow to which the first packet belongs. The processing unit 504 may configure the received ingress flow table entries into a local flow table. The flow rate determining unit 505 may periodically measure the flow rate of the traffic flow, compare the measured flow rate with the maximum flow rate of each forwarding path respectively, and select the flow rate identity of a forwarding path whose maximum flow rate is larger than the measured flow rate. The forwarding unit 502 may search in the local flow table for the characteristic information of the packet and the selected flow rate identity, add the selected flow rate identity into the packet based on a matched ingress flow table entry, and send the packet with the flow rate identity through an output port in the matched ingress flow table entry via the sending unit 503.

In addition, the receiving unit 501 may also receive a plurality of intermediate flow table entries sent by the SDN controller in packets conforming to the open flow protocol. The match fields in the intermediate flow table entries may have the same second packet characteristic information and different flow rate identities. The flow table entry processing unit 504 may configure the received intermediate flow table entries into the local flow table. The receiving unit 501 may receive a second packet with a flow rate identity. The second packet belongs to a traffic flow corresponding to the second packet characteristic information. The forwarding unit 502 may find an intermediate flow table entry matching with the packet characteristic information of the second packet and the flow rate identity in the second packet; the sending unit 503 may send the packet with the flow rate identity through an output port in the matched intermediate flow table entry.

The receiving unit 501 may also receive an egress flow table entry sent by the SDN controller through a packet conforming to the open flow protocol. The match field in the egress flow table entry may include third packet characteristic information. The receiving unit 501 may receive a third packet with a flow rate identity. The third packet belongs to a traffic flow corresponding to the third packet characteristic information. The forwarding unit 502 may search in a local flow table to find the egress flow table entry matching with the characteristic information of third packet which includes the flow rate identity, removes the flow rate identity from the third packet. The sending unit 503 may send the packet via an output port in the matched egress table entry.

Figure 6:
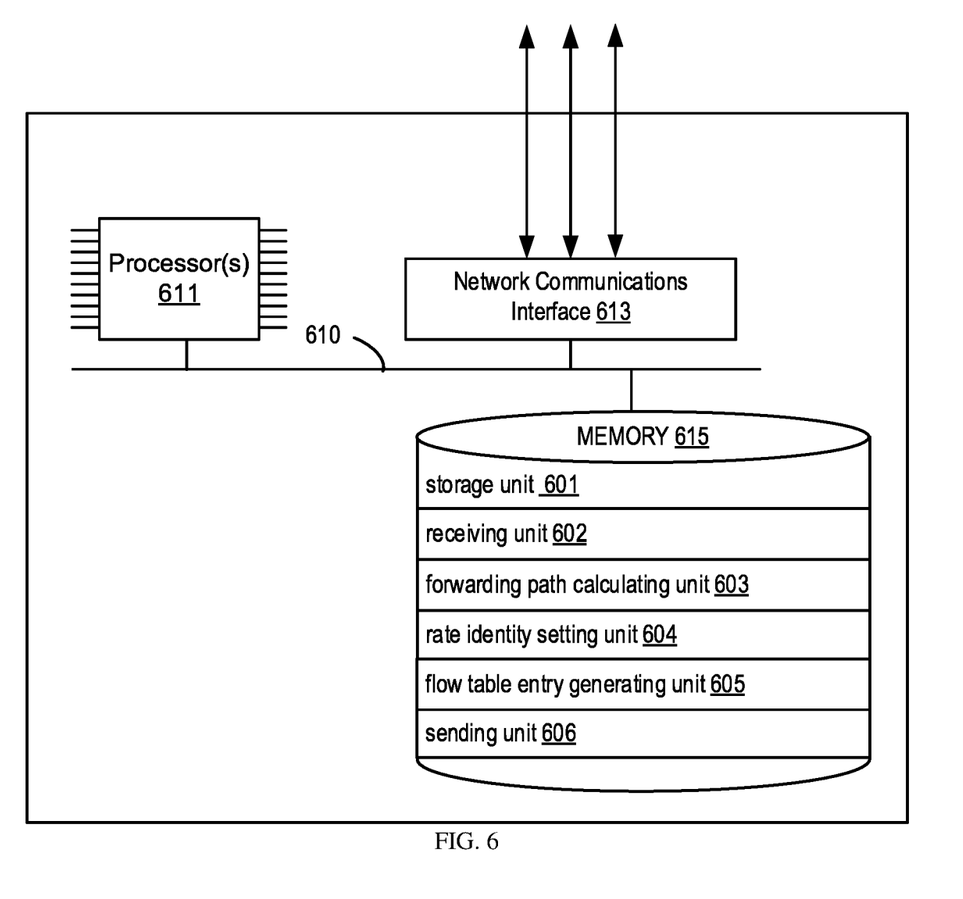
FIG. 6 is a schematic diagram illustrating an SDN controller in accordance with examples of the present disclosure.

FIG. 6 is a schematic diagram illustrating an SDN controller in accordance with examples of the present disclosure. As shown in FIG. 6, the SDN controller may include: a processor 611, a storage device 614, a network communication interface 613 and a coupling mechanism 610.

The processor 611 may be a single processor, or may be a set of a plurality of processors. The processor 611 may include a plurality of processing cores. The processor 611 may be in a device, or may be distributed in a plurality of devices.

The network communication interface 613 may communicate with other network devices via wired or wireless connections based on a communication protocol.

The units may exchange information via the coupling mechanism 610.

The storage device 614 may store various data and machine-readable instructions. As shown in FIG. 6, the storage device 614 may include: a storage unit 601, a receiving unit 602, a forwarding path calculating unit 603, a rate identity setting unit 604, a flow table entry generating unit 605 and a sending unit 606. The units may be machine-readable instructions executable by the processor 611 to perform actions of corresponding units as shown in FIG. 4. The actions are not repeated herein.

Figure 7:
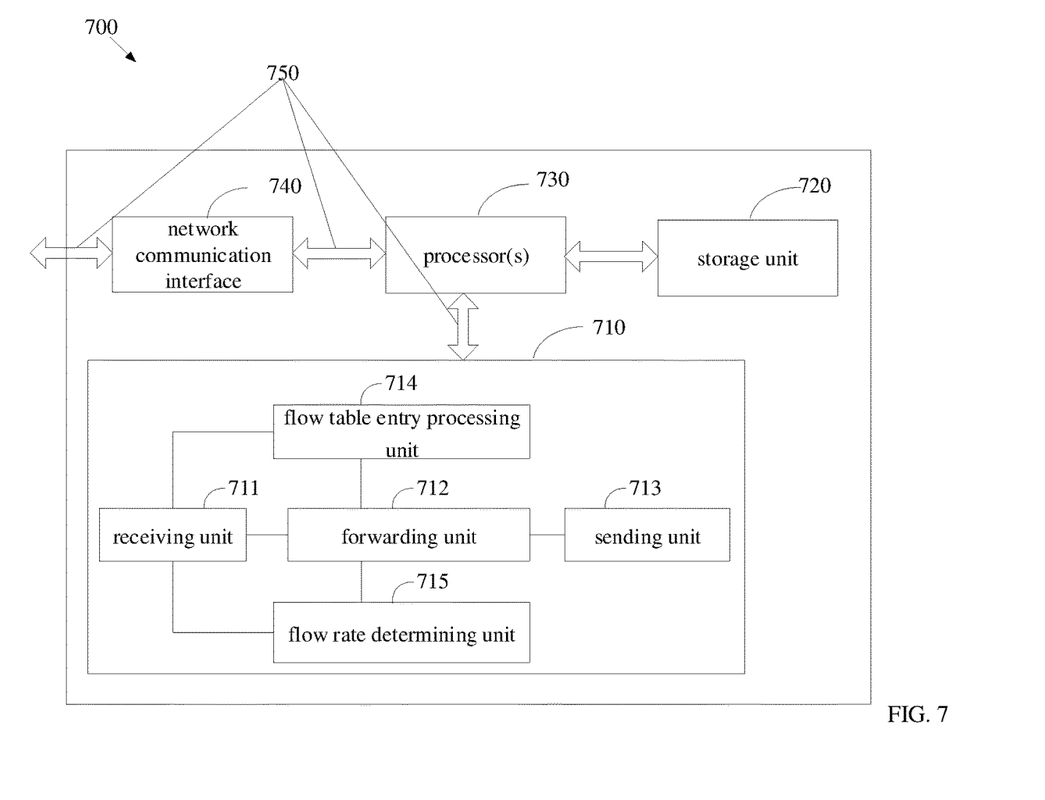
FIG. 7 is a schematic diagram illustrating an SDN switching device in accordance with examples of the present disclosure.

FIG. 7 is a schematic diagram illustrating an SDN switching device in accordance with examples of the present disclosure. As shown in FIG. 7, the SDN switching device may include: a forwarding unit 710, a storage unit 720, a processor 730, a network communication interface 740, and a coupling mechanism 750.

The forwarding unit 710 may be a chip such as Application Specific Integrated Circuit (ASIC), Field-Programmable Gate Array (FPGA), or the like. The forwarding unit 710 may include a receiving unit 711, a forwarding unit 712, a sending unit 713, a flow table entry processing unit 714 and flow rate determining unit 715. The units in the forwarding unit 710 have similar functions with corresponding units as shown in FIG. 5. Thus the functions are not repeated herein.

The processor 730 may be a single processor, or may be a set of a plurality of processors. The processor 730 may include a plurality of processing cores.

The network communication interface 740 may communicate with other network devices via wired or wireless connections based on a communication protocol.

The forwarding unit, the storage unit 720, the processor 730 and the network communication interface 740 may interact with each other through the coupling mechanism 750.

Based on various examples of the present disclosure, the SDN controller may generate flow table entries for an ingress node and intermediate nodes on each forwarding path based on forwarding paths of a traffic flow in the SDN network and the flow rate of the forwarding paths, so that the ingress node and the intermediate nodes on the forwarding paths of the traffic flow may dynamically select route and forward packets of the traffic flow based on the flow table entries and the flow rate of the traffic flow. As such, bandwidth utility ratio of links in the SDN network and flow forwarding success ratio can be increased.

It should be understood that in the above processes and structures, not all of the procedures and units are necessary. Certain procedures or units may be omitted based on the needs. The order of the procedures is not fixed, and can be adjusted based on the needs. The units are defined based on a function simply for facilitating description. In implementation, a unit may be implemented by multiple units, and functions of multiple units may be implemented by the same unit. The units may reside in the same device or distribute in different devices. The "first", "second" in the above descriptions are merely for distinguishing two similar objects, and have no substantial meanings.

The units in the figures may be specially designed hardware (e.g., special-purposed processor, such as FPGA or ASIC) or hardware executing machine-readable instructions. The machine-readable instructions may make an operating system on a computer to implement some or all of the operations. Non-transitory computer-readable storage medium may be a storage device in an extension board inserted in the computer or a storage device in an extension unit connected to the computer. The CPU in an extension board or an extension unit may execute some or all of the operations based on the instructions.

The non-transitory computer-readable storage medium may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. The instructions may be downloaded from a server computer via a communication network.

The scope of the claims should not be limited by the embodiments set forth in the examples, but should be given the broadest interpretation consistent with the description as a whole.

The invention claimed is:

1. A method of generating forwarding table entries, applicable to a software defined network (SDN) controller, wherein, the method comprising:
    calculating a plurality of forwarding paths for a traffic flow based on a topology of an SDN network;
    determining a maximum flow rate and a flow rate identity of each of the forwarding paths;
    generating a plurality of ingress flow table entries based on packet characteristic information of the traffic flow, the flow rate identity of each of the forwarding paths and an output port of an ingress node on each of the forwarding paths;
    generating an intermediate flow table entry for each of an intermediate node on each of the forwarding paths based on the packet characteristic information of the traffic flow, the flow rate identity of each of the forwarding paths and an output port of each intermediate node on each of the forwarding paths;
    generating an egress flow table entry based on the packet characteristic information of the traffic flow and an output port via which the traffic flow is sent by an egress node; and sending the maximum flow rate and the flow rate identity of each of the forwarding paths and the ingress flow table entries to the ingress node, each intermediate flow table entry to each corresponding intermediate node on each of the forwarding paths, and the egress flow table entry to the egress node.

2. The method of claim 1, wherein in each of the ingress flow table entries, a match field at least comprises the packet characteristic information and a flow rate identity; an instruction field comprises at least an output port of the ingress node on a forwarding path, an action of adding a flow rate identity and an action of sending a packet with the flow rate identity through the output port of the ingress node on the forwarding path;
    in each intermediate flow table entry, a match field at least comprises the packet characteristic information and a flow rate identity; an instruction field at least comprises an output port of an intermediate node on a forwarding path, an action of sending a packet with a flow rate identity through the output port of the intermediate node on the forwarding path;
    in the egress flow table entry, a match field at least comprises the packet characteristic information; an instruction field at least comprises the output port of the egress node, an action of removing a flow rate identity and an action of sending the packet without a flow rate identity through the output port of the egress node.

3. The method of claim 1, wherein calculating the plurality of forwarding paths for the traffic flow based on the topology of the SDN network comprises:
    receiving a first packet of the traffic flow sent by the ingress node;
    determining the egress node of the traffic flow in the topology of the SDN network; and calculating a plurality of forwarding paths between the ingress node and the egress node for the traffic flow based on the topology of the SDN network.

4. The method of claim 1, wherein calculating the plurality of forwarding paths for the traffic flow based on the topology of the SDN network comprises:
    determining the ingress node and the egress node of the traffic flow based on a pre-defined traffic flow characteristic list, and calculating a plurality of forwarding paths between the ingress node and the egress node for the traffic flow based on a network topology of an SDN forwarding domain and link states maintained by the SDN controller.

5. The method of claim 1, wherein determining the maximum flow rate and the flow rate identity of each of the forwarding paths comprises:
    determining the maximum flow rate of each of the forwarding paths based on bandwidth of each link on each of the forwarding paths;

sorting the forwarding paths based on respective maximum flow rates of the forwarding paths, setting a flow rate identity for each of the forwarding paths in an order of the sorted forwarding paths.

6. An apparatus of generating forwarding table entries, applicable to a software defined network (SDN) controller, comprising:
   a forwarding path calculating unit, to calculate a plurality of forwarding paths for a traffic flow based on a software defined network (SDN) topology;
   a rate identity setting unit, to determine a maximum flow rate and a flow rate identity of each of the forwarding paths;
   a flow table entry generating unit, to generate a plurality of ingress flow table entries based on packet characteristic information of the traffic flow and the flow rate identity of each of the forwarding paths and an output port of an ingress node on each of the forwarding paths, generate an intermediate flow table entry for each of an intermediate node on each of the forwarding paths based on the packet characteristic information of the traffic flow, the flow rate identity of each of the forwarding paths and an output port of each intermediate node on each of the forwarding paths, and generate an egress flow table entry for an egress node of the traffic flow based on the packet characteristic information of the traffic flow and an output port via which the egress node sends the traffic flow; and a sending unit, to send the maximum flow rate and the flow rate identity of each of the forwarding paths and the ingress flow table entries to the ingress node, send each intermediate flow table entry to each corresponding intermediate node on each of the forwarding paths, and send the egress flow table entry to the egress node.

7. The apparatus of claim 6, wherein in each of the ingress flow table entries, a match field at least comprises the packet characteristic information and the flow rate identity; an instruction field comprises at least the output port of the ingress node on a forwarding path, an action of adding a flow rate identity and an action of sending a packet with the flow rate identity through the output port of the ingress node on the forwarding path;
   in each intermediate flow table entry, a match field at least comprises the packet characteristic information and a flow rate identity; an instruction field at least comprises an output port of an intermediate node on a forwarding path, an action of sending a packet with a flow rate identity through the output port of the intermediate node on a forwarding path;
   in the egress flow table entry, a match field at least comprises the packet characteristic information; an instruction field at least comprises the output port of the egress node, an action of removing a flow rate identity and an action of sending the packet without a flow rate identity through the output port of the egress node.

8. The apparatus of claim 6, wherein, further comprising a receiving unit;
   the receiving unit is to receive the first packet of the traffic flow sent by the ingress node;
   the forwarding path calculating unit is to determine the egress node of the traffic flow in the SDN topology, and calculate a plurality of forwarding paths between the ingress node and the egress node for the traffic flow based on the SDN topology.

9. The apparatus of claim 8, wherein the rate identity setting unit is to determine the maximum flow rate of each of the forwarding paths based on bandwidth of each link on each of the forwarding paths, and set a flow rate identity for each of the forwarding paths based on an order of the forwarding paths sorted based on respective maximum flow rates of the forwarding paths.

10. The apparatus of claim 6, wherein the forwarding path calculating unit is to determine the ingress node and the egress node of the traffic flow based on a pre-defined traffic flow characteristic list, and calculate a plurality of forwarding paths between the ingress node and the egress node for the traffic flow based on a network topology of an SDN forwarding domain and link states maintained by the SDN controller.

11. The apparatus of claim 10, wherein the rate identity setting unit is to determine the maximum flow rate of each of the forwarding paths based on bandwidth of each link on each of the forwarding paths, and set a flow rate identity for each of the forwarding paths based on an order of the forwarding paths sorted based on respective maximum flow rates of the forwarding paths.

* * * * *